US012790983B2

(12) United States Patent
Moore et al.

(10) Patent No.: US 12,790,983 B2
(45) Date of Patent: Nov. 10, 2026

(54) STARTING GAS TURBINE ENGINES

(71) Applicant: ROLLS-ROYCE plc, London (GB)

(72) Inventors: Gareth E Moore, Nottingham (GB); Paul R Davies, Bristol (GB); Stephen M Husband, Derby (GB); David R Trainer, Derby (GB); David P Scothern, Derby (GB); Luke George, Derby (GB); Douglas M M Herbert, Derby (GB)

(73) Assignee: ROLLS-ROYCE plc, London (GB)

( * ) Notice: Subject to any disclaimer, the term of this patent is extended or adjusted under 35 U.S.C. 154(b) by 216 days.

(21) Appl. No.: 17/988,371

(22) Filed: Nov. 16, 2022

(65) Prior Publication Data

US 2023/0182917 A1 Jun. 15, 2023

(30) Foreign Application Priority Data

Dec. 14, 2021 (GB) ..................................... 2118040

(51) Int. Cl.
*F02C 7/268* (2006.01)
*B64D 27/33* (2024.01)
(Continued)

(52) U.S. Cl.
CPC .............. *F02C 7/268* (2013.01); *B64D 27/33* (2024.01); *B64D 31/06* (2013.01); *B64D 31/18* (2024.01);
(Continued)

(58) Field of Classification Search
CPC .. F02C 7/26; F02C 7/268; F02C 7/275; F02C 6/14
See application file for complete search history.

(56) References Cited

U.S. PATENT DOCUMENTS 3,696,612 A 10/1972 Berman
4,594,850 A 6/1986 Joy
(Continued)

FOREIGN PATENT DOCUMENTS

EP 2 728 141 A2 5/2014
EP 2 779 427 A2 9/2014
(Continued)

OTHER PUBLICATIONS

Noor Zainab Hussain, Rolls-Royce hit by further setback to fixing Boeing 787 engines, Sep. 20, 2019, Reuters, Aerospace and Defense, pp. 1-4, URL: https://www.reuters.com/article/us-rolls-royce-hldg-trent-1000/ rolls-royce-hit-by-further-setback-to-fixing-boeing-787-engines-idUSKBN1W50MP (Year: 2019).
(Continued)

*Primary Examiner* — Gerald L Sung
(74) *Attorney, Agent, or Firm* — Oliff PLC

(57) ABSTRACT

Multi-engine aircraft power and propulsion systems and methods of starting the engines of multi-engine aircraft disclosed, including supplying electrical power from an electrical power source to electric machines of the a first gas turbine engine and operating electric machines as motors to drive rotation of spools of the first gas turbine engine; starting the first gas turbine engine by lighting combustion equipment of the first gas turbine engine; operating the electric machines of the first gas turbine engine as generators to extract mechanical power and generate electrical power from spools of the first gas turbine engine; transferring the electrical power to electric machines of a second gas turbine engine and operating the electric machines as motors to drive rotation of spools of the second gas turbine engine; and starting the second gas turbine engine by lighting combustion equipment of the second gas turbine engine.

19 Claims, 3 Drawing Sheets

(51) Int. Cl.

| | |
|---|---|
| ***B64D 31/06*** | (2006.01) |
| ***B64D 31/18*** | (2024.01) |
| *B64D 41/00* | (2006.01) |
| *F01D 15/10* | (2006.01) |

(52) U.S. Cl.

CPC .... *B64D 2041/002* (2013.01); *B64D 2221/00* (2013.01); *F01D 15/10* (2013.01); *F05D 2220/323* (2013.01); *F05D 2220/76* (2013.01); *F05D 2260/85* (2013.01)

(56) References Cited

U.S. PATENT DOCUMENTS

| | | | | |
|---|---|---|---|---|
| 5,309,029 | A | 5/1994 | Gregory et al. | |
| 5,486,553 | A | 1/1996 | Deaner et al. | |
| 5,539,027 | A | 7/1996 | Deaner et al. | |
| 6,992,403 | B1 | 1/2006 | Raad | |
| 9,515,597 | B2 * | 12/2016 | O'Donnell | H02P 5/747 |
| 10,583,931 | B2 | 3/2020 | Cline et al. | |
| 11,549,464 | B2 | 1/2023 | Terwilliger et al. | |
| 2006/0042252 | A1 | 3/2006 | Derouineau | |
| 2006/0168968 | A1 | 8/2006 | Zielinski et al. | |
| 2008/0072571 | A1 | 3/2008 | Beardsley et al. | |
| 2008/0110151 | A1 | 5/2008 | Welch et al. | |
| 2008/0149445 | A1 | 6/2008 | Kern et al. | |
| 2009/0224599 | A1 | 9/2009 | Yue et al. | |
| 2009/0288421 | A1 | 11/2009 | Zeiner et al. | |
| 2011/0178648 | A1 | 7/2011 | Calvignac et al. | |
| 2012/0318914 | A1 | 12/2012 | Rajashekara et al. | |
| 2014/0260306 | A1 | 9/2014 | Dooley et al. | |
| 2014/0333127 | A1 | 11/2014 | Edwards | |
| 2015/0123463 | A1 | 5/2015 | Huang et al. | |
| 2015/0300918 | A1 | 10/2015 | Greubel | |
| 2016/0052417 | A1 * | 2/2016 | Zhou | B60L 15/2045 701/22 |
| 2016/0107588 | A1 | 4/2016 | White et al. | |
| 2016/0195025 | A1 | 7/2016 | Ajami et al. | |
| 2016/0215729 | A1 | 7/2016 | Sabnis | |
| 2018/0003072 | A1 | 1/2018 | Lents et al. | |
| 2018/0097427 | A1 | 4/2018 | Auker et al. | |
| 2018/0112599 | A1 | 4/2018 | Dalal | |
| 2018/0138716 | A1 | 5/2018 | Bailey et al. | |
| 2018/0216526 | A1 | 8/2018 | Dalal et al. | |
| 2018/0278127 | A1 | 9/2018 | Huang et al. | |
| 2018/0291807 | A1 | 10/2018 | Dalal | |
| 2018/0339790 | A1 | 11/2018 | Huang | |
| 2018/0354632 | A1 | 12/2018 | Hon et al. | |
| 2019/0085765 | A1 | 3/2019 | Nolcheff et al. | |
| 2019/0118960 | A1 | 4/2019 | Izquierdo Gil | |
| 2019/0181669 | A1 | 6/2019 | Solodovnik et al. | |
| 2019/0181786 | A1 | 6/2019 | Singh et al. | |
| 2019/0257250 | A1 | 8/2019 | Veilleux, Jr. et al. | |
| 2019/0376405 | A1 * | 12/2019 | Lavoie | F02N 11/08 |
| 2020/0106336 | A1 | 4/2020 | Klaus et al. | |
| 2020/0173369 | A1 * | 6/2020 | Husband | F02C 9/00 |
| 2020/0180454 | A1 | 6/2020 | Gao et al. | |
| 2020/0191010 | A1 | 6/2020 | Tan-Kim et al. | |
| 2020/0290742 | A1 | 9/2020 | Kumar et al. | |
| 2020/0309039 | A1 | 10/2020 | Smith | |
| 2020/0392859 | A1 | 12/2020 | Turner | |
| 2020/0392903 | A1 | 12/2020 | Turner | |
| 2020/0392909 | A1 | 12/2020 | Turner | |
| 2021/0070458 | A1 | 3/2021 | Sanders et al. | |
| 2021/0101692 | A1 | 4/2021 | Fox | |
| 2021/0115857 | A1 | 4/2021 | Collopy | |
| 2021/0172382 | A1 | 6/2021 | Bruce | |
| 2021/0387723 | A1 | 12/2021 | Moon et al. | |
| 2021/0396185 | A1 | 12/2021 | Duscha | |
| 2022/0063826 | A1 | 3/2022 | Hiett et al. | |
| 2022/0290616 | A1 | 9/2022 | Okuwa et al. | |
| 2023/0167785 | A1 | 6/2023 | Davies et al. | |

FOREIGN PATENT DOCUMENTS

| | | | |
|---|---|---|---|
| EP | 2 801 719 | A1 | 11/2014 |
| EP | 3 208 429 | A1 | 8/2017 |
| EP | 3 415 436 | A1 | 12/2018 |
| EP | 3344545 | B1 | 6/2019 |
| EP | 3 578 464 | A1 | 12/2019 |
| EP | 3 597 883 | A1 | 1/2020 |
| EP | 3 609 035 | A1 | 2/2020 |
| EP | 3 793 050 | A1 | 3/2021 |
| EP | 3 793 051 | A1 | 3/2021 |
| EP | 3 796 502 | A1 | 3/2021 |
| EP | 3 832 097 | A1 | 6/2021 |
| EP | 3 943 398 | A1 | 1/2022 |
| FR | 2961767 | A1 | 12/2011 |
| GB | 2 422 875 | A | 8/2006 |
| GB | 2 542 920 | A | 4/2017 |
| WO | 2014/143218 | A1 | 9/2014 |
| WO | 2015/034517 | A1 | 3/2015 |
| WO | 2017/066223 | A1 | 4/2017 |

OTHER PUBLICATIONS

Jun. 14, 2023 Office Action Issued in U.S. Appl. No. 17/988,504.

Jul. 14, 2023 extended Search Report issued in European Patent Application No. 22208022.8.

Jane's Aero-Engines, Issue Seven, Edited by Bill Gunston, Jane's Information Group Inc., Alexandria, Virginia, 2000, pp. 1-47 and 510-512. (Year: 2000).

Jun. 13, 2022 Search Report issued in GB Patent Application No. 2118040.1.

Jun. 14, 2022 Search Report issued in GB Patent Application No. 2118039.3.

Jun. 14, 2022 Search Report issued in GB Patent Application No. 2118041.9.

Jun. 14, 2022 Search Report issued in GB Patent Application No. 2118044.3.

Jun. 14, 2022 Search Report issued in GB Patent Application No. 2118045.0.

U.S. Appl. No. 17/988,538, filed Nov. 16, 2022 in the name of Moore et al.

U.S. Appl. No. 17/988,393, filed Nov. 16, 2022 in the name of Moore et al.

U.S. Appl. No. 17/988,504, filed Nov. 16, 2022 in the name of Moore et al.

U.S. Appl. No. 17/988,341, filed Nov. 16, 2022 in the name of Moore et al.

Feb. 6, 2024 U.S. Office Action issued in U.S. Appl. No. 17/988,393.

Jun. 2, 2023 extended Search Report issued in European Patent Application No. 22208020.2.

Jun. 6, 2023 extended Search Report issued in European Patent Application No. 22208025.1.

Dec. 15, 2023 Notice of Allowance issued in U.S. Appl. No. 17/988,504.

May 9, 2023 Search Report issued in European Patent Application No. 22208027.7.

May 17, 2023 Extended Search Report issued in European Patent Application No. 22208019.4.

May 24, 2024 U.S. Office Action issued in U.S. Appl. No. 17/988,393.

Jul. 14, 2026 Notice of Allowance received in U.S. Appl. No. 17/988,341.

* cited by examiner

STARTING GAS TURBINE ENGINES

CROSS-REFERENCE TO RELATED APPLICATIONS

This specification is based upon and claims the benefit of priority from United Kingdom Patent Application No. 2118040.1, filed on 14 Dec. 2021, the entire contents of which are incorporated herein by reference.

TECHNICAL FIELD

This disclosure concerns the starting of propulsive gas turbine engines of multi-engine aircraft.

BACKGROUND

To successfully light the combustion equipment of a propulsive gas turbine engine of a stationary aircraft, and thus start the engine, it is first necessary to drive rotation of a compressor section of the engine to a speed high enough to maintain adequate airflow through the core of the engine. A number of different ways of performing this function are known.

One known approach utilizes an aircraft auxiliary power unit (APU) and an air turbine starter. The APU is a small gas turbine engine, typically located towards the rear of the aircraft, which can be electrically started using a relatively small electric machine powered by a ground cart or battery. High pressure air taken from the APU is directed to the air turbine starter, which includes a turbine mechanically coupled with a shaft of the propulsive gas turbine engine. The high pressure air from the APU thus drives rotation of the turbine of the air turbine starter, which in turn cranks the connected shaft of the gas turbine until it reaches starting speed.

Another approach utilizes a so-called starter-generator which is coupled to a shaft of the engine. During flight, the starter-generator operates in a generator mode to generate electrical power for electrical systems of the engine and aircraft. In its starter mode, the starter-generator operates in a motor mode to crank the connected engine shaft until the gas turbine reaches starting speed. In the starter mode the starter-generator is electrically powered by a ground cart or by a generator driven by an APU.

It would be desirable to provide alternative approaches to starting propulsive gas turbine engines, especially if they provide opportunities to reduce aircraft or engine weight or improve engine operability and efficiency.

SUMMARY

According to a first aspect, there is provided a multi-engine aircraft power and propulsion system comprising: first and second propulsive gas turbine engines, each comprising combustion equipment; a plurality of spools; and one or more electric machines mechanically coupled with one or more of the plurality spools; an electrical system connecting one or more electric machines of the first gas turbine engine and one or more electric machines of the second gas turbine engine; and a control system configured to control the first and second gas turbine engines and the electrical system during an engine start-up procedure. The start-up procedure comprises: supplying electrical power from an electrical power source to one or more of the electric machines of the first gas turbine engine and operating said one or more electric machines as motors to drive rotation of one or more spools of the first gas turbine engine; starting the first gas turbine engine by lighting the combustion equipment of the first gas turbine engine; operating one or more of the electric machines of the first gas turbine engine as generators to extract mechanical power and generate electrical power from one or more of the spools of the first gas turbine engine; transferring, via the electrical system, electrical power generated by the one or more electric machines of the first gas turbine engine to one or more of the electric machines of the second gas turbine engine and operating said one or more electric machines as motors to drive rotation of one or more spools of the second gas turbine engine; and starting the second gas turbine engine by lighting the combustion equipment of the second gas turbine engine.

By electrically cross-linking the first and second propulsive gas turbine engines, the second engine can be started using power generated by the first engine after the first engine has been started. This can reduce or even eliminate the need to use a ground cart or APU to start the engines. For instance, if the aircraft includes energy storage sufficient to electrically start the first engine (that is, the electrical power source is on-board energy storage such as a battery, super-capacitor, fuel cell or a combination thereof), no ground cart is necessary and the APU may—optionally—be entirely omitted from the aircraft. Removing the APU would reduce the mass of the aircraft, which would reduce the fuel consumption of the engines. Eliminating the need for ground carts would reduce the need for airports to keep and maintain the carts, and possibly reduce turnaround times between flights.

Whilst in preferred embodiments the electrical power source takes the form of energy storage for the aforementioned reasons, it will be understood that the electrical power source could also be an APU of the aircraft, or a ground-based power source such as a ground cart could be used. Either of these could also be used in combination with power from on-board energy storage.

Where present, the energy storage system may have a high energy storage capacity relative to the platform power. For example, a ratio defined as a total energy storage capacity of the electrical energy storage system divided by: a combined maximum rated thrust of the first and second propulsive gas turbine engines, may be greater than or equal to 0.1 $WhN^{-1}$. The ratio may be between 0.15 and 0.50 $WhN^{-1}$. In an embodiment the ratio is between 0.18 and 0.45 $WhN^{-1}$. In one group of embodiments the ratio is between 0.18 and 0.28 $WhN^{-1}$. In another group of embodiments the ratio is between 0.25 and 0.42 $WhN^{-1}$.

The electrical system may comprise a dc electrical power distribution system, with the electrical power that is transferred from the first engine to the second engine being transferred in dc form over the dc electrical distribution system.

Aircraft conventionally utilize an ac distribution system, partly because the use of ac has advantages in terms of lower cost and weight due to a reduced need for power electronics converters. However, it has been found that the use a dc distribution system provides significant advantages in terms of cross-engine electric starting. This is because the use of an ac distribution system necessitates that all electrical generators providing power to the ac system output their power at the same frequency. In a multi-spool gas turbine engine, each of the spools will rotate at a different speed at essentially any engine operating point. Whilst variable frequency drives (VFDs) associated with the electric machines may be used to provide ac outputs at a common, preferably constant, ac frequency despite the different operating speeds of the associated spools, this may in practice be difficult to implement with an acceptable level of power quality. This may in practice mean that the use of an ac system limits the amount of power which can be transferred to the second engine to the amount of power which can be extracted from a single engine spool. The amount of power available from one spool can be significant at some engine operating points, for example maximum take-off. However, it would be undesirable to power the first engine up to maximum take-off in order to start the second engine, partly because this would burn a significant amount of fuel. At lower power conditions, for example ground idle, the amount of power available from one spool of the first engine is much smaller, and in many cases may not be enough to start the second engine. Whilst the deficit could be made up using energy storage, this could create the need to charge the energy storage between the starting of the first engine and the starting the second engine (if energy storage was used to start the first engine), creating a delay in starting the second engine. Alternatively, it could create the need for a larger amount of energy storage, which could add a significant amount of weight. By using a dc distribution system, power can be sourced from multiple spools of a multi-spool engine, allowing the second engine to be started using power generated from the first engine even at lower-power conditions such as ground idle.

As noted above, starting the second gas turbine engine using only electrical power generated by the one or more electric machines of the first gas turbine engine may reduce a required size of the energy storage system and/or eliminate the need to recharge the energy storage system between the starting of the first and second engines. However, in some embodiments it may be preferable to share the power requirement between the one or more electric machines of the first engine and the electrical power source (e.g. the energy storage system). In this case, if necessary, the energy storage system may be at least partially recharged between the starting of the first and second engines using electrical power generated by the one or more electric machines of the first engine. In this way, the second engine may be started at even lower power conditions of the first engine, which can for example reduce noise associated with the engine start procedure. Each of the first and second gas turbine engines may comprise a first spool and a second spool. Each of the first and second gas turbine engines may comprise a first electric machine mechanically coupled with its first spool, and a second electric machine mechanically coupled with its second spool.

Operating the one or more of the electric machines of the first gas turbine engine as generators may comprise: operating both the first electric machine and the second electric machine of the first gas turbine engine as generators to extract mechanical power and generate electrical power from both the first spool and the second spool of the first gas turbine engine.

Transferring electrical power generated by the one or more electric machines of the first gas turbine engine to one or more of the electric machines of the second gas turbine engine, and operating said one or more electric machines as motors to drive rotation of one or more spools of the second gas turbine engine may comprise: transferring the electrical power generated from both the first and second spool of the first gas turbine engine to one or both of the first electric machine of the second gas turbine engine and/or the second electric machine of the second gas turbine engine, and operating said one or both of the first and/or second electric machine of the second gas turbine engine as motors to drive rotation of the first and/or second spool of the second gas turbine engine.

Thus, whilst power may be extracted from multiple spools of the first engine, it may be transferred to only the electric machine of one spool of the second engine. This may be the designated ‘starting spool’ of the engine, which is typically the high pressure (HP) spool though this is not necessarily the case (e.g. the intermediate pressure (IP) spool of a three-spool engine could be used). In other embodiments, power is delivered to the machines of multiple spools of the second engine. The electrical system may further comprise: a first ac-dc converter connecting the first electric machine of the first gas turbine engine to the dc power distribution system; a second ac-dc converter connecting the second electric machine of the first gas turbine engine to the dc power distribution system; a third ac-dc converter connecting the first electric machine of the second gas turbine engine to a dc power distribution system; and a fourth ac-dc converter connecting the second electric machine of the second gas turbine engine to a dc distribution system. The use of dedicated power converters for each electric machine may improve the flexibility and operability of the system.

The dc electrical power distribution system may comprise: a first dc distribution bus connected with dc sides of the first and second ac-dc converters; a second dc distribution bus connected with dc sides of the third and fourth ac-dc converters; and a bus tie operable to connect together the first and second dc distribution busses, whereby electrical power generated by the first and/or second electric machine of the first gas turbine engine can be transferred to the first and/or second electric machine of the second gas turbine engine. Thus, the first and second engines may have functionally independent electric distribution systems which are capable of connection for the purposes of cross-starting, and possibly also management of faults or failure in the engines and/or electrical system.

For each of the first and second propulsive gas turbine engines: the first electric machine may comprise a first sub-machine and a second sub-machine; and the second electric machine may comprise a first sub-machine and a second sub-machine.

The term “sub-machine” of an electric machine will be understood by those skilled in the art to refer to one of a plurality of functionally separate electric machines which share some common structure. In other words, each sub-machine is capable of generating separate electrical power or torque (depending on the mode of the operation, i.e. generator mode or motor mode), but each one of the plurality of sub-machines is not totally physically independent from the other sub-machines and thus all of the sub-machines must be deployed together. For example, two sub-machines of an electric machine may share a common rotor but have completely independent stators; they may some common stator structure (e.g. a common back iron or yoke) but have separate stator field windings; or they may be integrated together in a common casing with common support structures and cooling systems. Thus, an electric machine with two sub-machines may be considered to be an integrated arrangement of two functionally separate electric machines.

By dividing the overall power requirement of each electric machine between two sub-machines, there is a greater redundancy in the power generation system. This may reduce the extent to which the machines must be over-rated, which may reduce the machine mass. Furthermore, it may allow the second engine to be started using electrical power generated from the first engine even in the presence of a fault or failure of a phase, or even entire sub-machine, of a machine in the first engine.

The electrical system may further comprise: a first set of ac-dc converters connecting the first and second sub-machines of the first electric machine of the first gas turbine engine to the dc power distribution system; a second set of ac-dc converter connecting the first and second sub-machines of the second electric machine of the first gas turbine engine to the dc power distribution system; a third set of ac-dc converters connecting the first and second sub-machines of the first electric machine of the second gas turbine engine to a dc power distribution system; and a fourth set of ac-dc converters connecting the first and second sub-machines of the second electric machine of the second gas turbine engine to a dc distribution system. Utilizing a dedicated power converter for each sub-machine improves fault tolerance, as a failure in a converter will not completely eliminate the ability to provide electrical power to or receive electrical power from an engine spool.

The dc electrical power distribution system may comprise: a first pair of dc distribution busses connected with dc sides of the first and second sets of ac-dc converters; a second pair of dc distribution bus connected with dc sides of the third and fourth sets of ac-dc converters; a first bus tie operable to connect together one dc distribution bus of the first pair of dc distribution busses and one dc distribution bus of the second pair of dc distribution busses, whereby electrical power generated by the first and/or second electric machine of the first gas turbine engine can be transferred to the first and/or second electric machine of the second gas turbine engine; and a second bus tie operable to connect together the other dc distribution bus of said first pair of dc distribution busses and the other dc distribution bus of said second pair of dc distribution busses, whereby electrical power generated by the first and/or second electric machine of the first gas turbine engine can be transferred to the first and/or second electric machine of the second gas turbine engine. Such an arrangement may provide a particularly high degree of fault tolerance.

For each respective one of the first and second gas turbine engines, a ratio, $P_1/T$, equal to the maximum electrical power generation rating of the first electric machine divided by the maximum thrust rating of the gas turbine engine, may be greater than or equal to 2.0 $WN^{-1}$. The thrust rating is a dry thrust rating (i.e. without the use of reheat/afterburner, if such a system is present in the engine). The first spool may be an intermediate pressure (IP) spool of the gas turbine engine. The term "intermediate pressure spool" will be understood to refer to a spool which is neither the highest pressure nor the lowest pressure spool of the engine. In other embodiments, the first spool is a low pressure (LP) spool of the gas turbine engine. The term "low pressure spool" will be understood to refer to the lowest pressure spool of the gas turbine engine. In some embodiments, the LP spool drives a fan via a reduction gearbox so that the fan rotates at a lower speed than the LP spool. The value of the ratio, $P_1/T$, may be significantly higher than in conventional gas turbine engines.

The value of the ratio, $P_1/T$, may be greater than 2.5 $WN^{-1}$, greater than 3.0 $WN^{-1}$, or even greater than 3.5 $WN^{-1}$. The value of the ratio, $P_1/T$, may be less than 7.0 $WN^{-1}$, less than 6.5 $WN^{-1}$, less than 6.0 $WN^{-1}$, or less than 5.5 $WN^{-1}$. The value of the ratio, $P_1/T$, may be between 2.5 $WN^{-1}$ and 6.0 $WN^{-1}$ or between 3.0 $WN^{-1}$ and 5.5 $WN^{-1}$. In one embodiment the value of the ratio, $P_1/T$, is between 3.5 $WN^{-1}$ and 5.0 $WN^{-1}$.

For each respective one of the first and second gas turbine engines, a ratio, $P_2/T$, equal to the maximum electrical power generation rating of the second electric machine divided by the maximum thrust rating of the gas turbine engine, may be greater than or equal to 3.5 $WN^{-1}$. The thrust rating is a dry thrust rating (i.e. without the use of reheat/afterburner, if such a system is present in the engine). The second spool may be a high pressure (HP) spool of the gas turbine engine. The term "high pressure spool" will be understood to refer to the highest pressure spool of the engine. The value of the ratio, $P_2/T$, may be significantly higher than in conventional gas turbine engines.

The value of the ratio, $P_2/T$, may be greater than 4.0 $WN^{-1}$, greater than 4.5 $WN^{-1}$, greater than 5.0 $WN^{-1}$ or even greater than 5.5 $WN^{-1}$. The value of the ratio, $P_2/T$, may be less than 10.0 $WN^{-1}$, less than 9.5 $WN^{-1}$, less than 9.0 $WN^{-1}$, or less than 8.5 $WN^{-1}$. The value of the ratio, $P_2/T$, may be between 4.0 $WN^{-1}$ and 9.5 $WN^{-1}$, between 4.5 $WN^{-1}$ and 9.0 $WN^{-1}$, between 5.0 $WN^{-1}$ and 8.5 $WN^{-1}$ or between 5.5 $WN^{-1}$ and 8.0 $WN^{-1}$. In one embodiment the value of the ratio, $P_2/T$, is between 6.0 $WN^{-1}$ and 7.5 $WN^{-1}$. In another embodiment the electric machines of the first and second spool are equally rated, e.g. P1/T and P2/T may have equal or substantially equal values greater than or equal to 2.0 $WN^{-1}$.

For each respective one of the first and second gas turbine engines, a ratio defined as the combined rated power of all of the one or more electrical machines mechanically coupled with the one or more spools of the respective gas turbine engine divided by the maximum rated thrust of the respective gas turbine engine may be greater than 4.5 $WN^{-1}$. The thrust rating is a dry thrust rating (i.e. without the use of reheat/afterburner, if such a system is present in the engine). The value of the ratio may be significantly higher than in conventional gas turbine engines, and may be particularly beneficial for allowing cross-engine electric starting over a wide range of engine operating points.

The ratio may be greater than 5.0 $WN^{-1}$, for example greater than 5.5 $WN^{-1}$, greater than 6.0 $WN^{-1}$, greater than 6.5 $WN^{-1}$, greater than 7.0 $WN^{-1}$, or even greater than 7.5 $WN^{-1}$. The ratio may be less than 15.0 $WN^{-1}$. In one group of embodiments, the ratio is between 5.5 $WN^{-1}$ and 13 $WN^{-1}$, and is preferably between 6.0 $WN^{-1}$ and 12.5 $WN^{-1}$. In one embodiment, the ratio is between 8.0 $WN^{-1}$ and 12.0 $WN^{-1}$.

For each respective one of the first and second gas turbine engines, one or more and optionally all of the electric machines may be embedded with a core of the respective gas turbine engine. Embedding machines within the engine core, such that they are coaxial with and directly driven by the engine spools, may reduce mechanical losses and thus improve the margin for cross-engine electric start.

Each of the propulsive gas turbine engines may be of any suitable type known in the art. For example, each engine may be of the ducted fan or turbofan type, or of the unducted or open rotor type.

According to a second aspect, the control system of the first aspect is provided separately. The control system may take the form of a controller or one or more controllers, each of which may be implemented in hardware, software of a combination of the two. The control system may comprise one or more functional modules of a wider control system. In some embodiments, the control system is or is part of an Electronic Engine Controller (EEC), Engine Control Unit (ECU) or Full Authority Digital Engine Controller (FADEC).

According to a third aspect, there is provided a multi-engine aircraft comprising the power and propulsion system of the first aspect.

According to a fourth aspect, there is provided a method of starting propulsive gas turbine engines of a multi-engine aircraft. The aircraft comprises: first and second propulsive gas turbine engines, each comprising combustion equipment; a plurality of spools; and one or more electric machines mechanically coupled with one or more of the plurality spools; and an electrical system electrically connecting one or more electric machines of the first gas turbine and one or more electric machines of the second gas turbine. The method comprises: supplying electrical power from an electrical power source to one or more of the electric machines of the first gas turbine engine and operating said one or more electric machines as motors to drive rotation of one or more spools of the first gas turbine engine; starting the first gas turbine engine by lighting the combustion equipment of the first gas turbine engine; operating one or more of the electric machines of the first gas turbine engine as generators to extract mechanical power and generate electrical power from one or more spools of the first gas turbine engine; transferring, via the electrical system, electrical power generated by the one or more electric machines of the first gas turbine engine to one or more electric machines of the second gas turbine engine and operating said one or more electric machines as motors to drive rotation of one or more spools of the second gas turbine engine; and starting the second gas turbine engine by lighting the combustion equipment of the second gas turbine engine.

Each of the first and second gas turbine engines may comprise a first spool and a second spool; and each of the first and second gas turbine engines may comprise a first electric machine mechanically coupled with its first spool, and a second electric machine mechanically coupled with its second spool. Operating one or more electric machines of the first gas turbine engine as motors to drive rotation of one or more spools of the first gas turbine engine may comprise: operating one or both of the first and second electric machines of the first gas turbine engine as motors to drive rotation of the first and/or second spools of the first gas turbine engine.

Operating one or more of the electric machines of the first gas turbine engine as generators to extract mechanical power and generate electrical power from one or more spools of the first gas turbine engine may comprise: operating both the first and second electric machines of the first gas turbine engine as generators to extract mechanical power and generate electrical power from both the first spool and the second spool of the first gas turbine engine.

Operating one or more electric machines of the second gas turbine engine as motors to drive rotation of one or more spools of the second gas turbine engine may comprise: operating one or both of the first and second electric machines of the second gas turbine engine as motors to drive rotation of the first and/or second spools of the first gas turbine engine.

The electrical power source may comprise an energy storage system. The method may further comprise: prior to transferring electrical power generated by the one or more electric machines of the first gas turbine engine to one or more electric machines of the second gas turbine engine, charging the energy storage system using electrical power generated the one or more electric machines of the first gas turbine engine; and subsequent to charging the energy storage system and prior to starting the second gas turbine engine by lighting the combustion equipment of the second gas turbine engine, transferring electrical power from the energy storage system to the one or more electric machines of the second gas turbine engine.

A ratio defined as a peak electrical power generated by the one or more electric machines of the first gas turbine engine and transferred, via the electrical system, to the one or electric machines of the second gas turbine engine during the start-up procedure, divided by the maximum rated thrust of the first gas turbine engine, may be greater than or equal to 2.0 $WN^{-1}$. The thrust rating is a dry thrust rating (i.e. without the use of reheat/afterburner, if such a system is present in the engine). In some embodiments the ratio is even greater than 2.0 $WN^{-1}$, for example greater than or equal to 2.5 $WN^{-1}$, or greater than or equal to 3.0 $WN^{-1}$. The ratio may be less than 5.0 $WN^{-1}$, for example between 2.0 $WN^{-1}$ and 5.0 $WN^{-1}$, between 2.5 $WN^{-1}$ and 4.5 $WN^{-1}$, or between 3.0 $WN^{-1}$ and 4.0 $WN^{-1}$.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
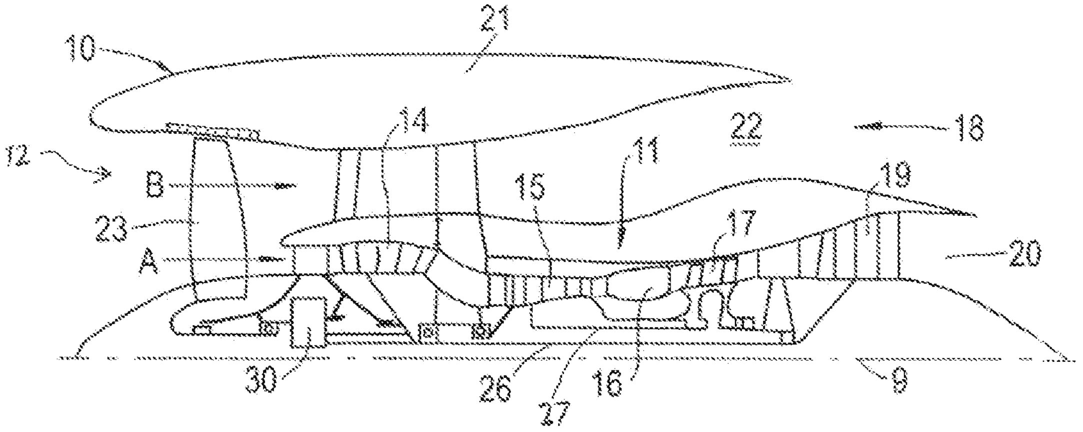
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

It will be understood that the low-pressure compressor 14, the low-pressure turbine 19 and the interconnecting shaft 26 together form the low-pressure spool. Similarly, the high-pressure compressor 15, the high-pressure turbine 17 and the interconnecting shaft 27 together form the high-pressure spool.

FIG. 2

Figure 2:
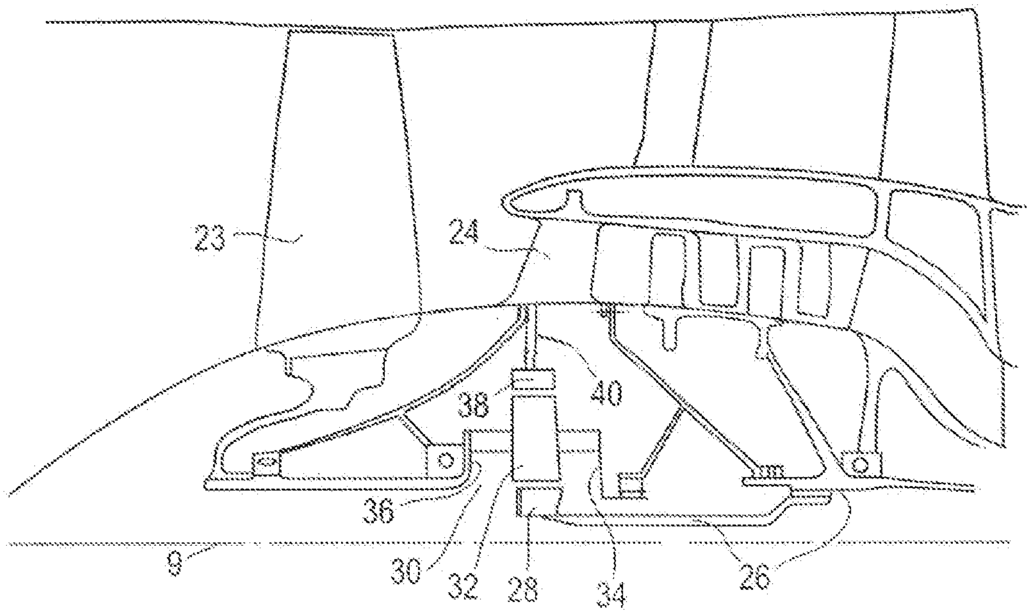
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3

Figure 3:
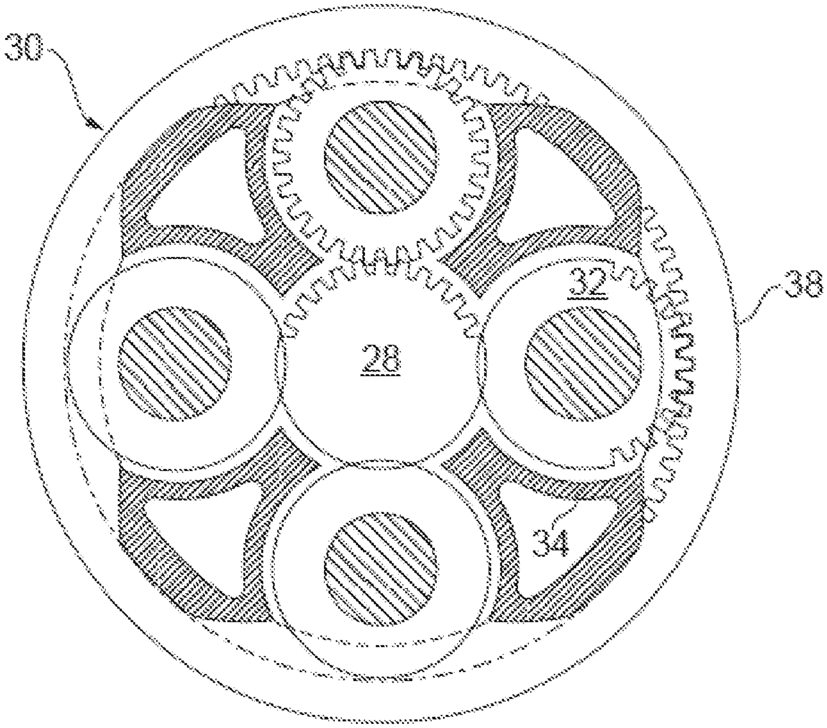
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4

Figure 4:
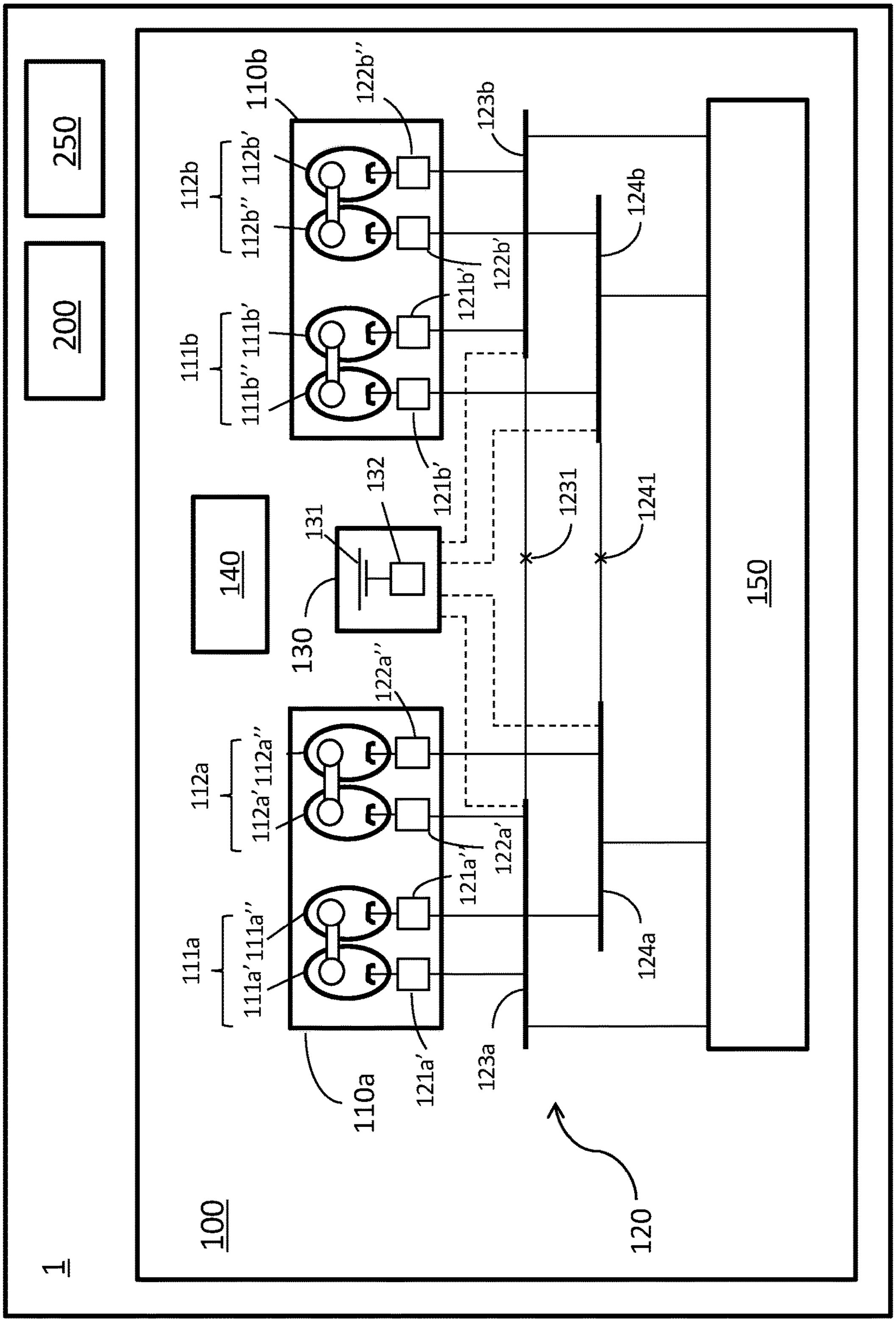
FIG. 4 is a schematic diagram of a twin-engine aircraft power and propulsion system including electric machines coupled with the spools of the engines.

FIG. 4 is a schematic illustration of an aircraft 1 with a multi-engine power and propulsion system 100. In accordance with the present disclosure, the power and propulsion system 100 is capable of performing a cross-engine electric start.

The illustrated power and propulsion system 100 includes two propulsive gas turbine engines 110*a*, 110*b*. It will however be understood that there could be a greater number of propulsive engines, for example three or four. Each of the illustrated engines 110*a*, 110*b* has two spools: a first spool, which in this case is a low-pressure spool having a low-pressure compressor 14; a low-pressure turbine 19; and an interconnecting shaft 26, and a second spool, which in this case is a high-pressure spool having high-pressure compressor 15; a high-pressure turbine 17; and an interconnecting shaft 27. The engine could alternatively be of the three-spool type and/or could include a gearbox as described above with reference to FIGS. 1-3. The engines 110*a*, 110*b* may be of the low- or high-bypass turbofan type or another type, for example the open rotor type.

Each of the propulsive gas turbine engines 110*a*, 110*b* includes two electric machines 111, 112: a first electric machine 111*a*, 111*b* (hereafter electric machine 111) mechanically coupled with its first spool and a second electric machine 112*a*, 112*b* (hereafter electric machine 112) coupled with its second spool. Each of the machines 111, 112 is operable as both a motor and as a generator. Thus, each machine 111, 112 can either drive rotation of its spool to increase its speed, or extract mechanical power from its spool and generate electrical power therefrom.

In a preferred embodiment one or both of the electric machines 111, 112 are coaxially coupled with the shafts of the spools and embedded within the core of the respective engine. The electric machines 111, 112 could, however, be coupled with the spools in another manner, for example through an auxiliary gearbox using a radial/tower shaft arrangement.

In this embodiment each electric machine 111*a-b*, 112 comprises two sub-machines: the first electric machine 111 comprises a first sub-machine 111' and a second sub-machine 111"; and the second electric machine 112 comprises a first sub-machine 112' and a second sub-machine 112". The term "sub-machine" will be understood to refer to one of a plurality of functionally separate electric machines which are physically integrated together to some extent. For example, the electric machine 111 may be a dual-wound machine having a single, common rotor and a single stator structure featuring two independent sets of field windings, with the two independent sets of windings forming the two sub-machines 111', 111". Alternatively, each of the two sub-machines 111', 111" may have its own stator and its own rotor axially spaced apart from the rotor and stator of the other sub-machine, with some common structure such as a common casing or mounting arrangement. Other sub-machine arrangements will occur to those skilled in the art. The overall power rating of each electric machine is preferably equally or approximately equally split between its two sub-machines, though this need not necessarily be the case: a split of 40-60% and 60-40% could be used, for example.

Each electric machine 111, 112 can be of any suitable type known in the art. In a preferred embodiment each machine 111, 112 is of the permanent magnet type, but induction or switched-reluctance machines could also be used, for example. The machines 111, 112 are preferably of the radial flux or transverse flux type, but other arrangements could be used.

The power and propulsion system 100 further includes an electrical system 120. The electrical system 120 includes one or more electrical distribution busses 123*a-b*, 124*a-b* which are electrically connected with the electric machines 111, 112 of the engines 110*a*, 110*b*. In this way, electrical power can be received from, delivered to and transferred between the electric machines 111, 112. Specifically, power generated by the electric machines 111, 112 of one engine (e.g. engine 110*a*) can be received by the electrical system 120 and transferred to the electric machines 111, 112 of the other engine 110*b*, one or both of which machines can be operated as motors to drive rotation of their respective spool(s).

In the illustrated embodiment the electrical system 120 is a dc electrical system with one or more dc electrical distribution busses 123*a-b*, 124*a-b* which interface with the electric machines 111, 112 through ac-dc power electronics converters. The use of a dc electrical system allows a single bus to simultaneously receive electrical power from electric machines driven to rotate at different speeds, allowing for so-called 'dual spool power generation'. This means that significant amounts of electrical power can be generated from one engine (e.g. engine 110*a*) even at low-power engine operating points, and transferred to one or more of the electric machines 111, 112 of the other engine 110*b* for starting purposes.

Each electric machine 111, 112 is connected with the dc electrical system 120 via a set of one or more bidirectional ac-dc converters. Specifically, the first electric machine 111*a* of the first engine 110*a* has a first set of bidirectional ac-dc converters including a first converter 121*a'* for its first sub-machine 111*a'* and a second converter 121*a"* for is second sub-machine 111*a"*. Likewise, the second electric machine 112*a* of the first engine 110*a* has a second set of bidirectional ac-dc converters, including a third converter 122*a'* for its first sub-machine 112*a'* and a fourth converter 122*a"* for its second sub-machine 112*a"*. Third and fourth sets of bidirectional ac-dc converters 121*b'*, 121*b"*, 122*b'*, 122*b"*, each having one converter for each of the two sub-machines, are provided for the electric machines 111*b*, 112*b* of the second engine 110*b*. Any suitable ac-dc converter topology may be used, for example H-bridges accompanied by appropriate filters. The first to fourth sets of converters, totaling eight converters, are hereafter referred to as "the converters 121, 122".

In the illustrated embodiment, each engine 110*a*, 110*b* of the power and propulsion system 100 is associated with its own set of one or more dc busses, and the sets of dc busses are selectively connectable with each other through bus ties. In this example, the first engine 110*a* is associated with a set of two busses 123*a*, 124*a*, and the second engine 110*b* is also associated a set of two busses 123*b*, 124*b*. The first bus 123*a* of the first set is connectable with the first bus 123*b* of the second set through a first bus tie 1231. The second bus 124*a* of the first set is connectable with the second bus 124*b* of the second set through a bus tie 1241. During some modes operation, perhaps including normal operation, the bus tie(s) 1231, 1241 are open so that electrical power cannot flow between the bus(ses) 123*a*, 124*a* associated with the first engine 110*a* and the bus(ses) 123*b*, 124*b* associated with the second engine 110*b*. However, the bus tie(s) 1231, 1241 are closed for the purposes of performing a cross-engine start and possibly the management of some fault conditions, for example a fault in one or more electric machines of an engine.

In the illustrated embodiment, the dc-sides of the ac-dc converters 121, 122 are connected with the dc busses 123*a-b*, 124*b* so as to provide a high degree of re-configurability, and thus fault tolerance, in addition to simultaneous dual-spool power generation. Specifically, since each electric machine 111, 112 comprises two sub-machines, each electric machine can be connected with each of the two busses of the set of busses associated with its engine. For the first engine 110*a*, the first sub-machine 111' of the first electric machine 111 is connectable with the first dc bus 123*a*, the second sub-machine 111" of the first electric machine 111 can be connected with the second dc bus 124*a*, the first sub-machine 112' of the second electric machine 111 can be connected with the first dc bus 123*a*, and the second sub-machine 112" of the second electric machine 112 can be connected with the second dc bus 124*a*. A corresponding arrangement applies to the second engine 110*b* and its set of dc busses 123*b*, 124*b*.

The power and propulsion system 100 preferably further includes an energy storage system (ESS) 130. In preferred embodiments the ESS 130 takes the form of a rechargeable battery pack or module 131, formed from lithium-ion cells or cells of another suitable type. As illustrated by the dashed lines, the ESS is connected with the electrical system 120, possibly via a dc-dc power electronics converter 132 for conditioning the power and matching it to voltage of dc electrical system 130. In this embodiment it can be seen that the ESS is connected with each of the dc distribution busses 123*a-b*, 124*a-b*. The ESS 130 may be used as an electrical power source to electrically start a first of the gas turbine engines (e.g. engine 110*a*).

The aircraft 1 may further include an Auxiliary Power Unit (APU) 200. In some embodiments, one or more electric machines (not shown) driven by the APU 200 are used as an electrical power source to replace or supplement the power provided by the ESS 130 during an electric start of the first engine (e.g. engine 110*a*). In other embodiments, however, the APU 200 may not be used for this purpose, or may be entirely omitted from the aircraft 1 to reduce weight. In some instances, for example where the ESS 130 is not present or insufficiently charged and the APU is omitted or unable to provide power, a ground cart may be used to provide electrical power to start the first engine 110*a*.

An APU 200 is generally not capable of being started during flight. Thus, the aircraft may also further include a Ram Air Turbine (RAT) 250 or other emergency source of electrical power. In case of a loss of electrical power, the RAT 250 may be deployed, for example to charge the ESS 130 to allow an inflight restart attempt. In preferred embodiments, however, the RAT 250 may be omitted entirely to reduce aircraft weight, with the combination of the ESS 130 and the cross-engine electric restart function providing sufficient engine restart capability.

The power and propulsion system 100 further includes a control system 140. The control system 140, which can take any suitable form including a FADEC and may include one or more controllers and/or one or more functional modules, provides control of the engines 110*a*, 110*b* and electrical system 130, including the electrical machines 111, 112, ESS 130 and the associated power electronics 121, 122, 132. The control system 140 may, amongst other things, control: the configuration of the electrical system 120; the modes in which the electric machines 111, 112 of the engines 110*a*, 110*b* operate; the delivery of fuel into the combustion equipment 16 of the engines 110*a*, 110*b*; the mode of operation of the ESS 130 and/or APU 200; and parameters of the power electronics (e.g. switching frequencies and duty cycles of the semiconductor switches). A start-up procedure, at least partially performed under the control of the control system 140, is described below with reference to FIG. 5.

The power and propulsion system 100 is also shown to include a further electrical distribution system 150, which can receive electrical power from (and possibly deliver some electrical power to) the electrical system 120. The electrical system 150 facilitates the delivery of power to various other engine and platform electrical loads. The configuration of the electrical system 150 is beyond the scope of the present disclosure and will not be described further.

Compared with existing aircraft power and propulsion systems, the power and propulsion systems 100 of the present may have electric machines 111, 112 sized and designed so that a much greater amount of electrical power can be generated from the engine spools. Combined with dual spool power generation, this means various functions such as the simultaneous management of engine surge margin and charging of the ESS 130 are possible over a wide range of engine operating points.

Table 1 illustrates exemplary peak powers for the first machine 111 (coupled with the first spool, which may be a low-pressure or intermediate-pressure spool) and the second electric machine 112 (coupled with the second spool, which may be a high-pressure spool). The values are expressed as ratios, the divider being the peak engine thrust. For the avoidance of doubt, the ‘peak thrust’ is the peak dry thrust, which refers to the peak thrust without the use of any afterburner or reheat.

TABLE 1

| | Max. Power Rating/Max. Engine Thrust ($WN^{-1}$) | | |
|---|---|---|---|
| | Example 1 | Example 2 | Example 3 |
| Electric Machine 1 | 2.2 | 3.1 | 4.5 |
| Electric Machine 2 | 3.8 | 6.4 | 8.0 |
| Total | 6.0 | 9.5 | 12.5 |

For both the electric machine power and the engine thrust, the term ‘peak’ will be readily understood by those skilled in the art to refer to the ‘rated’ values, i.e. the maximum values for which the electric machine or engine are designed to operate in without causing damage to the components. As explained above, each electric machine 111, 112 may include multiple sub-machines 111', 111", 112', 112". In this case, the peak power an electric machine (e.g. electric machine 111) is the sum of the peak powers of each of its sub-machines 111', 111".

Compared with existing aircraft power and propulsion systems, the ESS 130 of the power and propulsion system 100 of the present disclosure may be sized and designed so as to provide a greater amount of electrical power relative to the size of the platform 1. Table 2 illustrates exemplary ESS energy storage capacities as well peak power and propulsion system thrusts (i.e. the sum of the peak thrusts of all of the propulsive engines of the platform). A ratio, defined as the total energy storage capacity divided by the maximum rated thrust of the power and propulsion system is also provided.

TABLE 2

| | Example 1 | Example 2 | Example 3 |
|---|---|---|---|
| Energy Storage Capacity (kWh) | 25 | 100 | 240 |
| Peak Platform Thrust (kN) | 100 | 600 | 600 |
| Ratio ($WhN^{-1}$) | 0.25 | 0.17 | 0.40 |

Various modifications and alternatives to the specific embodiments illustrated in FIG. 4 will occur to those skilled in the art. For example:

i. In the illustrated embodiment, the full power of each electric machine 111, 112 is split between two sub-machines 111', 111"; 112', 112". This need not be the case: each electric machine 111, 112 may be a single, larger electric machine of the full power rating. This may however reduce the fault-tolerance of the platform, and in particular may prevent cross-engine electric starting in the presence of one or more faults, for example a non-critical fault resulting in a partial or full loss of one or more of the electric machines.

ii. In principle each electric machine 111, 112 could have more than two (e.g. three or four) sub-machines, but the number will in practice be limited by space constraints.

iii. Whilst the illustrated embodiment has two dc busses per engine (e.g. 123*a*, 124*a* for engine 110*a*), fewer than two (i.e. one) or more than two dc busses could be provided. The use of a single bus would reduce fault tolerance compared with two busses. The use of more than two busses could increase fault tolerance but at the cost of increased system weight and complexity.

iv. Whilst each engine 110*a*, 110*b* is associated with its own set of one or more busses 123*a*, 124*a*; 123*b*, 124*b* in the illustrated embodiment, with connection via bus ties 1231, 1241, this need not be the case. The bus or busses may be permanently shared between the engines 110*a*, 110*b*, with no bus ties.

v. Whilst a battery 130 is illustrated, the ESS could take another form. It could, for example, additionally or alternatively include one or more supercapacitors. One or more fuel cells could also be used.

FIG. 5

Figure 5:
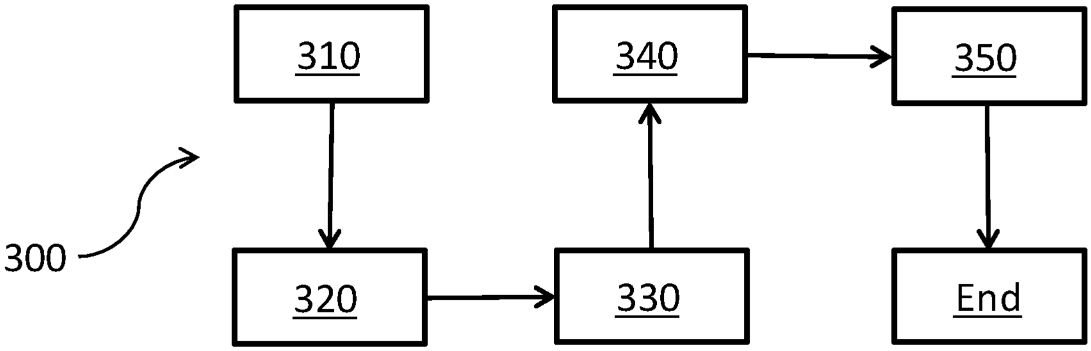
FIG. 5 is a flow diagram illustrating a method of starting first and second propulsive gas turbine engines of an aircraft.

FIG. 5 is a flow chart illustrating a cross-engine electric start procedure 300 for starting first and second propulsive gas turbine engines of an aircraft 1. The procedure may be initiated automatically or by a pilot of the aircraft 1, and may be performed under the control of a control system, for example the control system 140 of the power and propulsion system 100 of FIG. 4

The procedure begins at 310, where an electrical power source supplies electrical power to one or more of the electric machines 111, 112 of a first gas turbine engine (e.g. engine 110*a*). Said one or more electric machines 111, 112 are operated as motors so as to drive rotation of the associated spool or spools.

In some embodiments, one of the spools (e.g. the second spool) is designated as the starting spool and so power is supplied to only one of the electric machines (e.g. the second machine 112). In this case, the rotation of the starting spool draws air through the engine 110*a* and causes the other, non-driven, spool or spools to rotate. In other embodiments, power is supplied to both the first and second electric machines 111, 112 so that both the first and second spools are driven to rotate.

The electrical power source is preferably an ESS 130, for example a battery, supercapacitor, fuel cell or combination thereof. In other embodiments, however, an APU-powered electric machine, ground cart or the like are used in place of or to supplement the ESS 130.

Once the spools of the first engine 110*a* are rotating at sufficient speed, the procedure continues to 320 where the first gas turbine engine 110*a* is started by lighting its combustion equipment 16. The details of this are beyond the scope of the present disclosure, but will be familiar to those skilled in the art. In brief, the control system 140 will control the delivery of fuel into the combustor of the engine and ignite the fuel when a suitable fuel-to-air mixture is obtained. After lighting the combustion equipment 16, the electric machines 111, 112 may continue to motor the one or more spools for some time to increase the spool speed to a level where the engine operation becomes self-sustaining, i.e. when the combustion of fuel and resulting driving of the turbines can drive the compressors without the assistance of the electric machine 111, 112. For example, the combustor 16 may be lit at about 20% engine power, but the machines 111, 112 may continue to motor the spools until about 40% power.

With the first propulsive gas turbine 110*a* started and operating without the assistance of its electric machines 111, 112, the procedure moves to 330 where one or more of the electric machines 111, 112 are operated as generators to extract mechanical power and generate electrical power from the spool or spools.

In preferred embodiments, both of the electric machines 111, 112 are operated as generators during step 330 so that electrical power is generated from both of the first and second spools. This allows a relatively large amount of power to be generated even at lower-power operating points.

In some embodiments, power generated by the electric machines 111, 112 is used to charge the ESS 130 as it may have been at least partially discharged at 310.

At 340, the electrical power generated by the one or more electric machines 111, 112 of the first engine 110*a* is transferred to the one or more electric machines 111, 112 of the second engine 110*b* via an electrical system. The one or more electric machines 111, 112 of the second engine 110*b* are operated as motors so as to drive rotation of the associated spool or spools.

The electric system 120 is preferably a dc electrical system so that both of the electric machines 111, 112 of the first engine 110*a* can simultaneously operate as generators and interface with the same electrical distribution system. This way, a greater amount of power can be transferred to the machine(s) 111, 112 of the second engine 110*b*, even at lower-power engine operating points.

In some embodiments, power may also be transferred from the ESS 130 to the electric machines 111, 112 of the second engine 110*b*. In this way, the power required from the spools of the first engine 110*a* may be reduced.

In some embodiments, one of the spools (e.g. the second spool) is designated as the starting spool and so power is transferred to only one of the electric machines (e.g. the second machine 112). In this case, the rotation of the starting spool draws air through the engine 110*b* and causes the other, non-driven, spool or spools to rotate. In other embodiments, power is transferred to both the first and second electric machines 111, 112 so that both the first and second spools are driven to rotate.

The amount of electrical power transferred from the electric machine(s) 111, 112 of the first engine 110*a* to the electric machine(s) 111, 112 of the second engine may be relatively large. For example, the peak electrical power transferred from the from the electric machine(s) 111, 112 of the first engine 110*a* to the electric machine(s) 111, 112 of the second engine divided by the peak dry thrust of the first engine 110*a* may be greater than about 2.0 $WN^{-1}$, and in one specific example is about 3.3 $WN^{-1}$.

Finally, once the spools of the second engine 110*b* are rotating at sufficient speed, the procedure continues to 350 where the second gas turbine engine 110*b* is started by lighting its combustion equipment 16.

Thus, a starting procedure 300 which does not necessarily require the use of either an APU or a ground cart is provided. The procedure can take place without the use of an ESS with sufficient charge to start both engines, and can take place without the use of a high-power engine operating point such as maximum take-off.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A multi-engine aircraft power and propulsion system comprising:

first and second propulsive gas turbine engines, each comprising combustion equipment; a plurality of spools including at least a first spool and a second spool; and a first electric machine mechanically coupled with its first spool and a second electric machine mechanically coupled with its second spool;

an electrical system connecting the first and second electric machines of the first gas turbine engine and the first and second electric machines of the second gas turbine engine; and a control system configured to control the first and second gas turbine engines and the electrical system during an engine start-up procedure, the start-up procedure comprising:

supplying electrical power from an electrical power source to one or more of the first and second electric machines of the first gas turbine engine and operating said one or more electric machines as motors to drive rotation of one or more of the first and second spools of the first gas turbine engine;

starting the first gas turbine engine by lighting the combustion equipment of the first gas turbine engine;

operating both the first and second electric machines of the first gas turbine engine as generators to extract mechanical power and generate electrical power from both the first and second spools of the first gas turbine engine;

transferring, via the electrical system, electrical power generated from both the first spool and the second spool of the first gas turbine engine by the first and second electric machines of the first gas turbine engine at ground idle to one or both of the first and second electric machines of the second gas turbine engine and operating said one or both of the first and second electric machines of the second gas turbine engine as motors to drive rotation of said one or both of the first and second spools of the second gas turbine engine, wherein the first spool of the first gas turbine engine does not individually generate sufficient electrical power at ground idle to drive rotation of the second gas turbine engine, and the second spool of the first gas turbine engine does not individually generate sufficient electrical power at ground idle to drive rotation of the second gas turbine engine; and starting the second gas turbine engine by lighting the combustion equipment of the second gas turbine engine, wherein for each respective one of the first and second gas turbine engines, a first ratio, $P_1/T$, equal to the maximum electrical power generation rating of the first electric machine divided by the maximum thrust rating of the gas turbine engine, is greater than or equal to 2.0 $WN^{-1}$, for each respective one of the first and second gas turbine engines, a second ratio, $P_2/T$, equal to the maximum electrical power generation rating of the second electric machine divided by the maximum thrust rating of the gas turbine engine, is greater than or equal to 3.5 $WN^{-1}$, and the maximum electrical power generation rating of the first electric machine and the maximum electrical power generation rating of the second electric machine are different.

2. The aircraft power and propulsion system of claim 1, in which, for each respective one of the first and second gas turbine engines, a ratio defined as:

the combined rated power of the first and second electrical machines mechanically coupled with the first and second of the respective first or second gas turbine engine divided by the maximum rated thrust of the respective gas turbine engine is greater than or equal to 4.5 $WN^{-1}$.

3. The aircraft power and propulsion system of claim 1, in which the electrical system comprises a dc electrical power distribution system.

4. The aircraft power and propulsion system of claim 1, in which the electrical system comprises a dc electrical power distribution system, and the electrical system further comprises:

a first ac-dc converter connecting the first electric machine of the first gas turbine engine to the dc electrical power distribution system;

a second ac-dc converter connecting the second electric machine of the first gas turbine engine to the dc power distribution system;

a third ac-dc converter connecting the first electric machine of the second gas turbine engine to the dc power distribution system; and a fourth ac-dc converter connecting the second electric machine of the second gas turbine engine to the de distribution system.

5. The aircraft power and propulsion system of claim 4, in which the dc electrical power distribution system comprises:

a first dc distribution bus connected with dc sides of the first and second ac-dc converters;

a second dc distribution bus connected with dc sides of the third and fourth ac-dc converters; and a bus tie operable to connect together the first and second dc distribution busses, whereby electrical power generated by the first and/or second electric machine of the first gas turbine engine can be transferred to the first and/or second electric machine of the second gas turbine engine.

6. The aircraft power and propulsion system of claim 1, in which, for each of the first and second propulsive gas turbine engines:

the first electric machine comprises a first sub-machine and a second sub-machine; and the second electric machine comprises a first sub-machine and a second sub-machine.

7. The aircraft power and propulsion system of claim 6, in which the electrical system comprises a dc electrical power distribution system, and the electrical system further comprises:

a first set of ac-dc converters connecting the first and second sub-machines of the first electric machine of the first gas turbine engine to the dc power distribution system;

a second set of ac-dc converters connecting the first and second sub-machines of the second electric machine of the first gas turbine engine to the dc power distribution system;

a third set of ac-dc converters connecting the first and second sub-machines of the first electric machine of the second gas turbine engine to the dc power distribution system; and a fourth set of ac-dc converters connecting the first and second sub-machines of the second electric machine of the second gas turbine engine to the de distribution system.

8. The aircraft power and propulsion system of claim 7, in which the dc electrical power distribution system comprises:

a first pair of dc distribution busses connected with dc sides of the first and second sets of ac-dc converters;

a second pair of dc distribution bus connected with dc sides of the third and fourth sets of ac-dc converters;

a first bus tie operable to connect together one de distribution bus of the first pair of dc distribution busses and one dc distribution bus of the second pair of de distribution busses, whereby electrical power generated by the first and/or second electric machine of the first gas turbine engine can be transferred to the first and/or second electric machine of the second gas turbine engine; and a second bus tie operable to connect together the other de distribution bus of said first pair of dc distribution busses and the other de distribution bus of said second pair of dc distribution busses, whereby electrical power generated by the first and/or second electric machine of the first gas turbine engine can be transferred to the first and/or second electric machine of the second gas turbine engine.

9. The aircraft power and propulsion system of claim 1, in which the electrical power source comprises an energy storage system of an aircraft.

10. The aircraft power and propulsion system of claim 9, in which a ratio defined as:

a total energy storage capacity of the electrical energy storage system divided by a combined maximum rated thrust of the first and second propulsive gas turbine engines is greater than or equal to 0.1 $WhN^{-1}$.

11. The aircraft power and propulsion system of claim 10, in which the ratio is between 0.15 and 0.50 $WhN^{-1}$.

12. The aircraft power and propulsion system of claim 1, in which the electrical power source comprises an auxiliary power unit, APU, of the aircraft.

13. The aircraft power and propulsion system of claim 1 in which, for each respective one of the first and second gas turbine engines, one or more of the first electric machine and the second electric machine are embedded with a core of the respective gas turbine engine.

14. An aircraft comprising the power and propulsion system of claim 1.

15. The aircraft power and propulsion system of claim 1 in which, for each respective one of the first and second gas turbine engines, the first electric machine and the second electric machine are embedded with a core of the respective gas turbine engine.

16. A method of starting propulsive gas turbine engines of a multi-engine aircraft, the aircraft comprising: first and second propulsive gas turbine engines, each comprising combustion equipment; a plurality of spools including at least a first spool and a second spool; a first electric machine mechanically coupled with the first spool; a second electric machine mechanically coupled with the second spool; and an electrical system electrically connecting the first and second electric machines of the first gas turbine and the first and second electric machines of the second gas turbine, the method comprising:

supplying electrical power from an electrical power source to one or more of the first and second electric machines of the first gas turbine engine and operating said one or more electric machines as motors to drive rotation of one or more of the first and second spools of the first gas turbine engine;

starting the first gas turbine engine by lighting the combustion equipment of the first gas turbine engine;

operating both the first and second electric machines of the first gas turbine engine as generators to extract mechanical power and generate electrical power from the first and second spools of the first gas turbine engine;

transferring, via the electrical system, electrical power generated from both the first and second spools of the first gas turbine engine by the first and second electric machines of the first gas turbine engine at ground idle to one or more of the first and second electric machines of the second gas turbine engine and operating said one or more electric machines of the second gas turbine engine as motors to drive rotation of one or more of the first and second spools of the second gas turbine engine, wherein the first spool of the first gas turbine engine does not individually generate sufficient electrical power at ground idle to drive rotation of the second gas turbine engine, and the second spool of the first gas turbine engine does not individually generate sufficient electrical power at ground idle to drive rotation of the second gas turbine engine; and starting the second gas turbine engine by lighting the combustion equipment of the second gas turbine engine, wherein for each respective one of the first and second gas turbine engines, a first ratio, $P_1/T$, equal to the maximum electrical power generation rating of the first electric machine divided by the maximum thrust rating of the gas turbine engine, is greater than or equal to 2.0 $WN^{-1}$, for each respective one of the first and second gas turbine engines, a second ratio, $P_2/T$, equal to the maximum electrical power generation rating of the second electric machine divided by the maximum thrust rating of the gas turbine engine, is greater than or equal to 3.5 $WN^{-1}$, and the maximum electrical power generation rating of the first electric machine and the maximum electrical power generation rating of the second electric machine are different.

17. The method of claim 16, in which the electrical power source comprises an energy storage system and the method further comprises:

prior to transferring electrical power generated by the first and second electric machines of the first gas turbine engine to one or more of the first and second electric machines of the second gas turbine engine, charging the energy storage system using electrical power generated by the first and second electric machines of the first gas turbine engine; and subsequent to charging the energy storage system and prior to starting the second gas turbine engine by lighting the combustion equipment of the second gas turbine engine, transferring electrical power from the energy storage system to the one or more electric machines of the second gas turbine engine.

18. The method of claim 16, in which a ratio defined as:

a peak electrical power generated by the first and second electric machines of the first gas turbine engine and transferred, via the electrical system, to the one or more of the first and second electric machines of the second gas turbine engine during the start-up procedure, divided by the maximum rated thrust of the first gas turbine engine is greater than or equal to 3 $WN^{-1}$.

19. The method of claim 16, in which the electrical power source comprises one or more of:

an energy storage system of the aircraft;

an auxiliary power unit, APU, of the aircraft; and/or a ground-based electrical power supply.

* * * * *